United States Patent [19]
Shiomi et al.

[11] Patent Number: 6,043,622
[45] Date of Patent: Mar. 28, 2000

[54] MOTOR DRIVE CONTROLLER

[75] Inventors: Hiroyuki Shiomi; Naoki Kawamata, both of Utsunomiya; Jun Ashiwa, Yokohama, all of Japan

[73] Assignee: Canon Kabushiki Kaisha, Tokyo, Japan

[21] Appl. No.: 09/064,855

[22] Filed: Apr. 23, 1998

[30] Foreign Application Priority Data

May 9, 1997 [JP] Japan .................................... 9-136042

[51] Int. Cl.⁷ .................................................. G05B 19/29
[52] U.S. Cl. .......................... 318/603; 318/432; 318/434; 388/907.5; 388/929
[58] Field of Search ................................ 388/907.5, 929; 318/432, 603, 434, 254, 138, 439

[56] References Cited

U.S. PATENT DOCUMENTS 5,447,414  9/1995  Nordby et al. .......................... 318/254

*Primary Examiner*—Karen Masih
*Attorney, Agent, or Firm*—Fitzpatrick, Cella, Harper & Scinto

[57] ABSTRACT

A one-phase electromagnetic motor drive controller includes a one-phase electromagnetic motor, a position detection mechanism for detecting a rotational position of the motor and a control mechanism for controlling the drive of the one-phase electromagnetic motor from the detected rotational position. When the torque constant of the motor is used as a parameter of a control calculation, the torque constant parameter is corrected by the relationship between it and the rotational position of the electromagnetic motor.

10 Claims, 13 Drawing Sheets

CONTROL WITHOUT CORRECTION

CONTROL WITH CORRECTION 0 deg 35 deg

-35 deg

FIG. 13

| ROTATIONAL POSITION INFORMATION (ABSOLUTE VALUE OF POSITION X) | TORQUE CONSTANT INFORMATION (100 WHEN TORQUE CONSTANT CORRECTION COEFFICIENT 0°) |
|---|---|
| $0 \leq X < 1$ | 100 |
| $1 \leq X < 2$ | 100 |
| ⋮ | ⋮ |
| $10 \leq X < 11$ | 98 |
| $11 \leq X < 12$ | 98 |
| $13 \leq X < 14$ | 97 |
| ⋮ | ⋮ |
| $20 \leq X < 21$ | 90 |
| $21 \leq X < 22$ | 89 |
| $22 \leq X < 23$ | 87 |
| ⋮ | ⋮ |
| $30 \leq X < 31$ | 73 |
| $31 \leq X < 32$ | 71 |
| $32 \leq X < 33$ | 68 |
| ⋮ | ⋮ |

MOTOR DRIVE CONTROLLER

BACKGROUND OF THE INVENTION

1. Field of the Invention

The present invention relates to a motor drive controller for controlling the drive of a motor while correcting a torque constant which is changed when the motor rotates, and more specifically, to a motor drive controller suitable to control the drive of a one-phase electromagnetic motor.

2. Description of the Related Art

In conventional one-phase electromagnetic motors, a torque constant used as a parameter for controlling the motors is often fixed to a particular torque constant parameter.

Since the torque constant of one-phase electromagnetic motors is indispensable as a known parameter to control the motor, the deviation of this parameter makes the motor control system unstable and causes a deterioration in the shaping property thereof. When the torque constant used as the parameter of control is fixed to a particular torque constant parameter, since the torque constant of one-phase electromagnetic motors greatly changes depending upon the position where it is driven in rotation, the actual torque constant may deviate from a parameter determined in a control calculation. Since the stability of control is lost in such a case, the range in which the motor is driven is restricted.

SUMMARY OF THE INVENTION

An object of the present invention made in view of the above circumstances is to provide a motor drive controller capable of correcting a torque constant depending upon a position where a motor is driven in rotation.

Another object of the present invention is to provide a motor drive controller by which the stability of control of a one-phase electromagnetic motor is secured.

According to one aspect, the present invention which achieves these objectives relates to a motor drive controller using a torque constant as a factor for determining a motor drive current. The controller comprises a motor, position detection means, arithmetic means, torque constant calculation means, and using means. The position detection means detects a rotational position of the motor and outputs signals. The position detection means detects a rotational position of the motor and outputs signals. The arithmetic means counts the signals from the position detection means to determine a count value and determines a plurality of linear approximation formulas in accordance with the count value. The torque constant calculation means determines a torque constant by a linear approximation formula determined by the arithmetic means. The using means uses the torque constant determined by the torque constant calculation means as the factor for determining the motor drive current. The plurality of approximation formulas determined by the arithmetic means are represented by a plurality of linear expressions and are selected from a plurality of linear expressions in accordance with the count value of the arithmetic means. The motor is a one-phase electromagnetic motor drivable in a specific angle range and the position detection means detects an angle position of the one-phase electromagnetic motor.

According to another aspect, the present invention that achieves these objectives relates to a motor drive controller using a torque constant as a factor for determining a motor drive current. The controller comprises a motor, position detection means, a counter, a register, comparison arithmetic means, torque constant calculation means, and using means. The position detection means detects a rotational position of the motor. The counter counts the signals from the position detection means and produces a count value. The register stores the value of an amount corresponding to a specific rotational position of the motor. The comparison arithmetic means compares the count value of the counter with the value stored in the register and determines a plurality of approximation formulas in accordance with the result of the comparison. The torque constant calculation means determines torque constants by the approximation formulas determined by the comparison arithmetic means. The using means uses the torque constants determined by the torque constant calculation means as the factor for determining the motor drive current. The register stores first and second values corresponding to first and second specific rotational positions of the motor and the comparison arithmetic means compares the count value of the counter with the first and second values stored in the register.

According to another aspect, the present invention which achieves these objectives relates to a motor drive controller using a torque constant as a factor for determining a motor drive current. The controller comprises a motor, position detection means, a counter, memory means, and using means. The position detection means detects a rotational position of the motor. The counter counts signals from the position detection means and produces a count value. The memory means stores information of a plurality of torque constants. Information of one of the plurality of torque constants is selected in accordance with the count value of the counter. The using means uses the selected torque constant stored in the memory means as the factor for determining the motor drive current. In addition, the memory means stores the relationship between position information as the count value of the counter and the torque constant information by summarizing it in a table, and the torque constant information corresponding to the count value of the counter is selected in reference to the table.

According to another aspect, the present invention which achieves these objectives relates to a motor drive controller using a torque constant as a factor for determining a motor drive current. The controller comprises a motor, position detection means, a counter, first and second registers, comparison arithmetic means, torque constant calculation means, and determining means. The position detection means detects a rotational position of the motor and generates a pulse signal at every specific rotation angle of the motor. The counter counts the pulse signals from the position detection means and provides a count value. The first register stores the value of an amount corresponding to a specific rotational of the motor. The comparison arithmetic means compares the count value of the counter with the value stored in the first register and determines a plurality of linear approximation formulas in accordance with the result of the comparison. The torque constant calculation means calculates torque constant correction coefficients from the approximation formulas determined by the comparison arithmetic means and determines torque constants. The second register stores a value corresponding to a target rotational position. The determining means determines an amount of drive current supplied to the motor by executing an arithmetic operation based on the torque constants determined by the torque constant calculation means, the value stored in the second register, and the count value of the counter. In addition, the second register stores the amount of a load imposed on a motor shaft of the motor and the value of an amount corresponding to a control gain and the determining means also calculates the amount of the load imposed on the motor shaft and the value of the amount corresponding to the control gain.

According to another aspect, the present invention which achieves these objectives relates to a motor drive controller using a torque constant as a factor for determining a motor drive current. The controller comprises a motor, position detection means, discrimination means, linear expression determination means, torque constant correction coefficient calculation means, and torque constant calculation means. The position detection means detects a rotational position of the motor. The discrimination means discriminates a particular zone in a specific rotational position where a present rotational position detected by the position detection means is located. The linear expression determination means determines the inclination value and the intercept value of a linear expression based on the zone determined by the discrimination means. The torque constant correction coefficient calculation means calculates a torque constant correction coefficient from the linear expression determined by the linear expression determination means and the present rotational position detected by the position detection means. The torque constant calculating means calculates a torque constant based on the torque constant coefficient obtained by the torque constant correction coefficient calculation means.

Further objects of the present invention will become clear from the specific embodiments described below.

BRIEF DESCRIPTION OF THE DRAWINGS

FIG. 13 is a table showing torque constants for every angle depending upon the characteristics of the torque and the rotational positions of a motor shown in FIG. 12.

DESCRIPTION OF THE PREFERRED EMBODIMENTS

Embodiments of the present invention will be described below with reference to the drawings.

(Embodiment 1)

Figure 1:
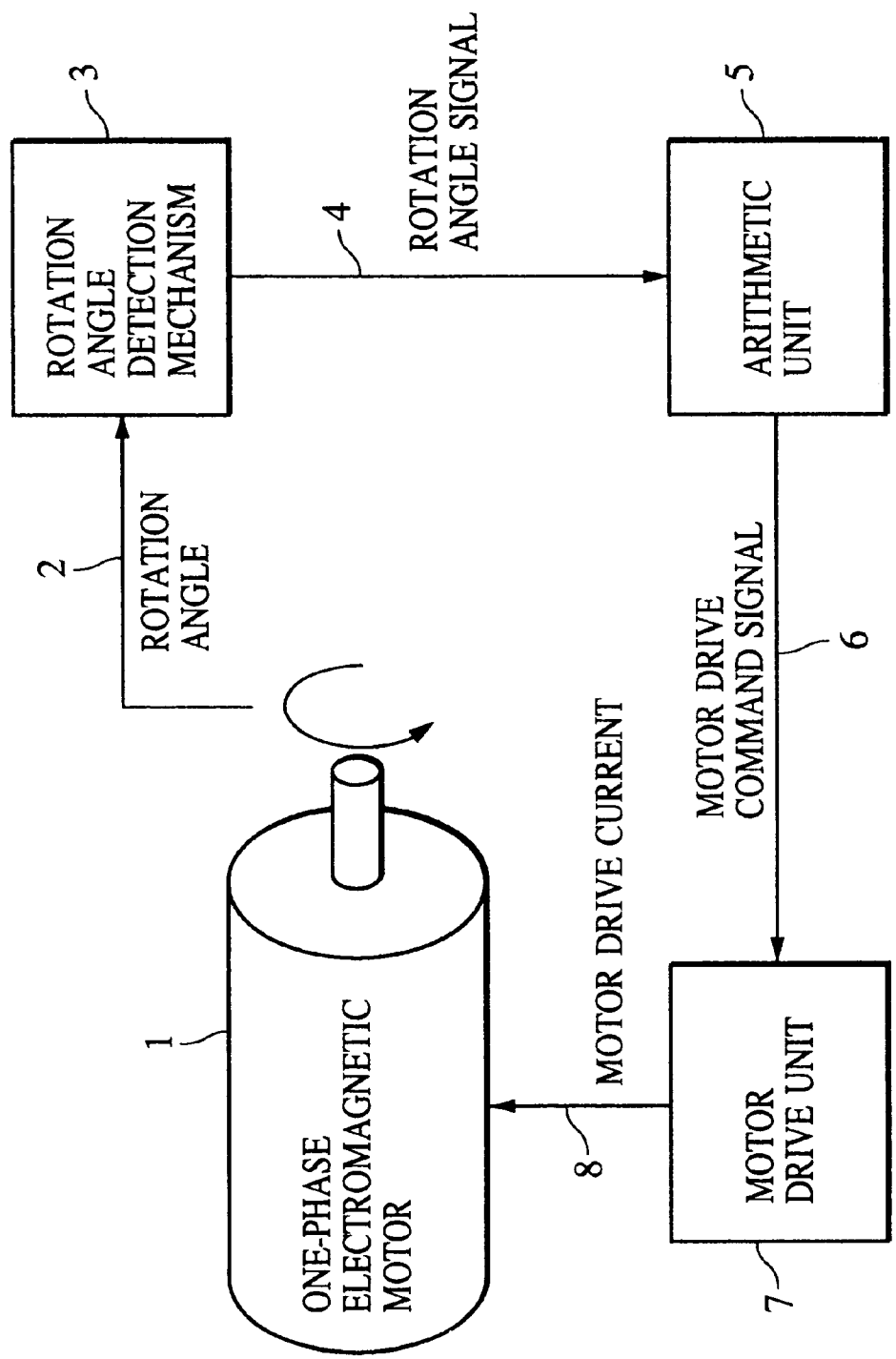
FIG. 1 is a block diagram of a motor drive controller according to a first embodiment of the present invention.

FIG. 1 is a block diagram showing a rotational position determination mechanism in a one-phase electromagnetic motor drive controller of an embodiment 1 of the present invention. In FIG. 1, numeral 1 denotes a one-phase electromagnetic motor, numeral 2 denotes a rotation angle of the motor, numeral 3 denotes a rotation angle detection mechanism, numeral 4 denotes a rotation angle signal output from the rotation angle detection mechanism, numeral 5 denotes an arithmetic unit, numeral 6 denotes a motor drive command signal output from arithmetic unit 5 to motor drive unit 7, numeral 7 denotes a motor drive unit and numeral 8 denotes a motor drive current output from motor drive unit 7 to motor 1.

The rotation angle 2 of the one-phase electromagnetic motor 1 is detected by the rotation angle detection mechanism 3 and the arithmetic unit 5 reads the rotation angle signal 4. The motor drive command signal 6 is calculated by the arithmetic unit 5 from the thus read rotation angle signal 4 by a particular control calculation and is supplied to the motor drive unit 7, which drives the motor 1 by the motor drive current 8. At the time, the following relational expression is established, where the torque of the motor 1 is represented by T, a torque constant is represented by Tp and the motor drive current 8 is represented by 1.

$$T = Tp \times I$$

Figure 2:
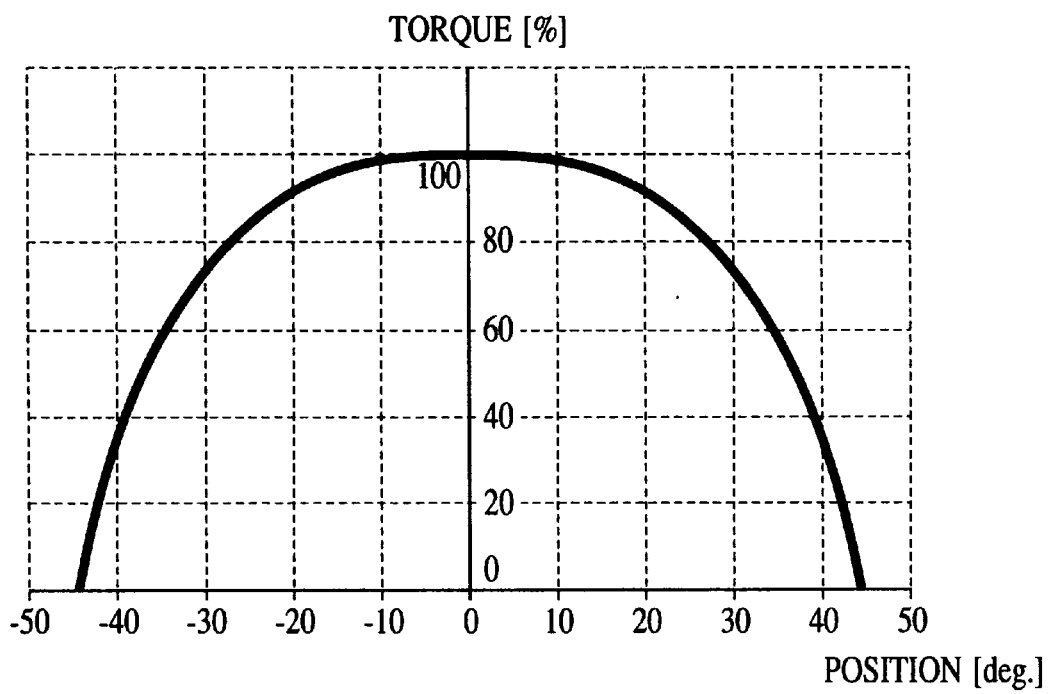
FIG. 2 is a graph showing the relationship between the torque and a rotational position of a motor shown in FIG. 1.

When it is supposed that the maximum torque is generated at 0° in the rotational position determination mechanism shown in FIG. 1, the one-phase electromagnetic motor 1 has a torque—rotational position curve (characteristics) as shown in FIG. 2.

Since the torque constant changes depending upon the rotational position of the motor, a large deviation occurs between the actual torque constant and the torque constant parameter, depending upon the motor's position. When the relationship between the rotation angle and the torque is represented by a relational expression and the relational expression is reflected in the torque constant parameter in a control calculation, the torque constant parameter can be corrected. However, when the relational expression is too complex, the arithmetic unit 5 requires a long calculation time and this adversely affects control. It is desirable, therefore, to make the relational expression as simple as possible.

Figure 3:
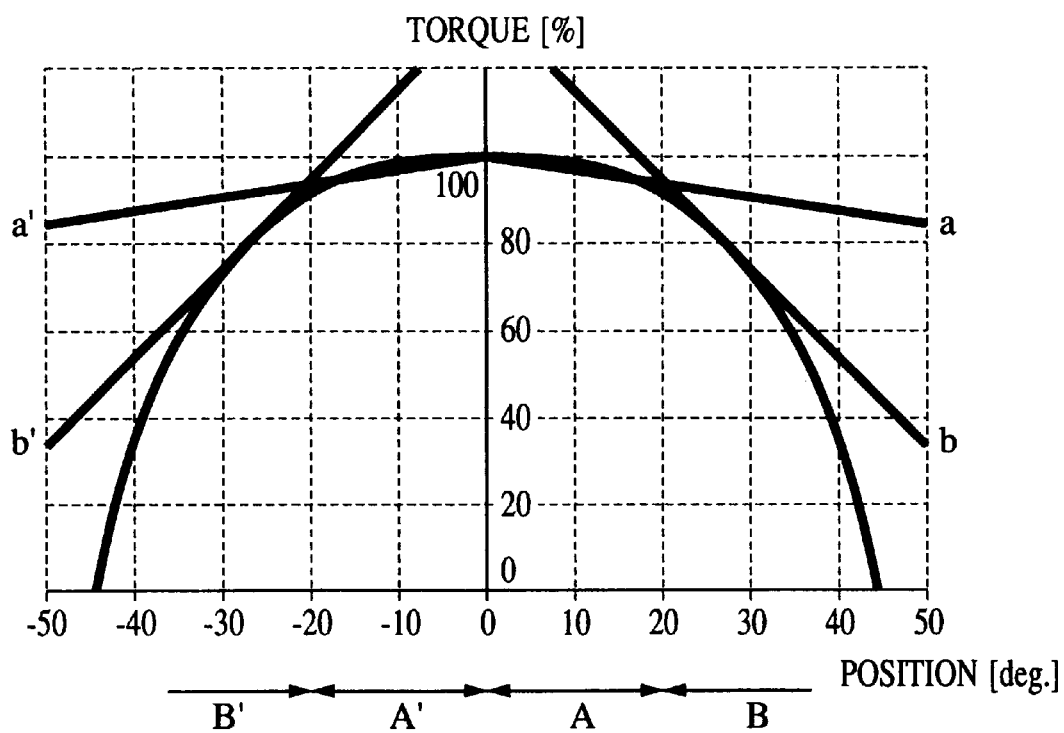
FIG. 3 is a graph showing linear lines which approximate the torque characteristics shown in FIG. 2, respectively when they are divided into four zones.

FIG. 3 shows an example in which the curve in FIG. 2 is divided into four zones and the curve in each zone is approximated by a linear line. Namely, the curve in a zone A (0° to +20°) is approximated by a linear line a; the curve in a zone B (larger than +20°) is approximated by a linear b; the curve in a zone A' (0° to −20°) is approximated by a linear line a'; and the curve in a zone B' (less than −20°) is approximated by a linear line b'. Since the torque rotational position curve shown in FIG. 2 is right-to-left symmetrical with respect to 0°, the linear lines a and b and the linear lines a' and b' can be represented by the same relational expressions when their positions are represented by absolute values. According to this approximation method, a torque constant parameter having a value approximately similar to the actual torque constant can be applied to a control calculation by a simple arithmetic operation in which absolute value conversion and condition branching are executed once, respectively using a linear expression within the range from −35° to 35°.

Figure 4:
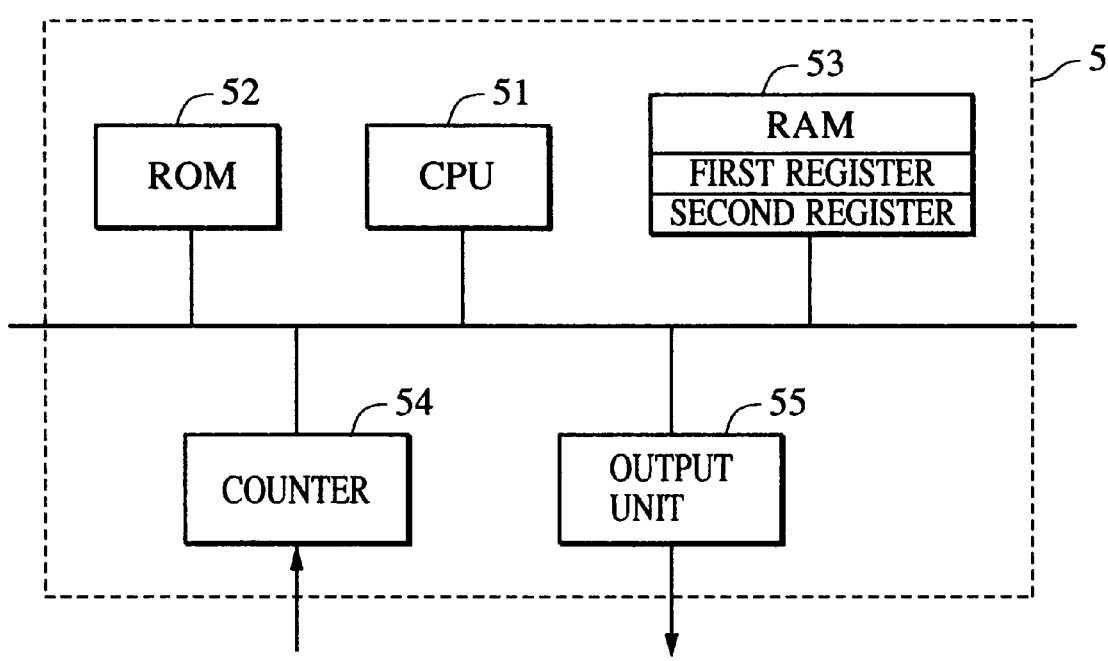
FIG. 4 is a block diagram showing an example of a specific circuit of an arithmetic unit shown in FIG. 1.

FIG. 4 shows an example of a specific circuit of the arithmetic unit 5 shown in FIG. 1, wherein numeral 51 denotes a CPU (Central Processing Unit) and a logical operation circuit is composed of the CPU 51, a ROM (Read Only Memory) 52 and a RAM (Random Access Memory) 53. RAM 53 includes first and second registers. Numeral 54 denotes a counter to which the rotation angle signal 4 is input and numeral 55 denotes an output unit for outputting the motor drive command signal to the motor drive unit 7.

Figure 5:
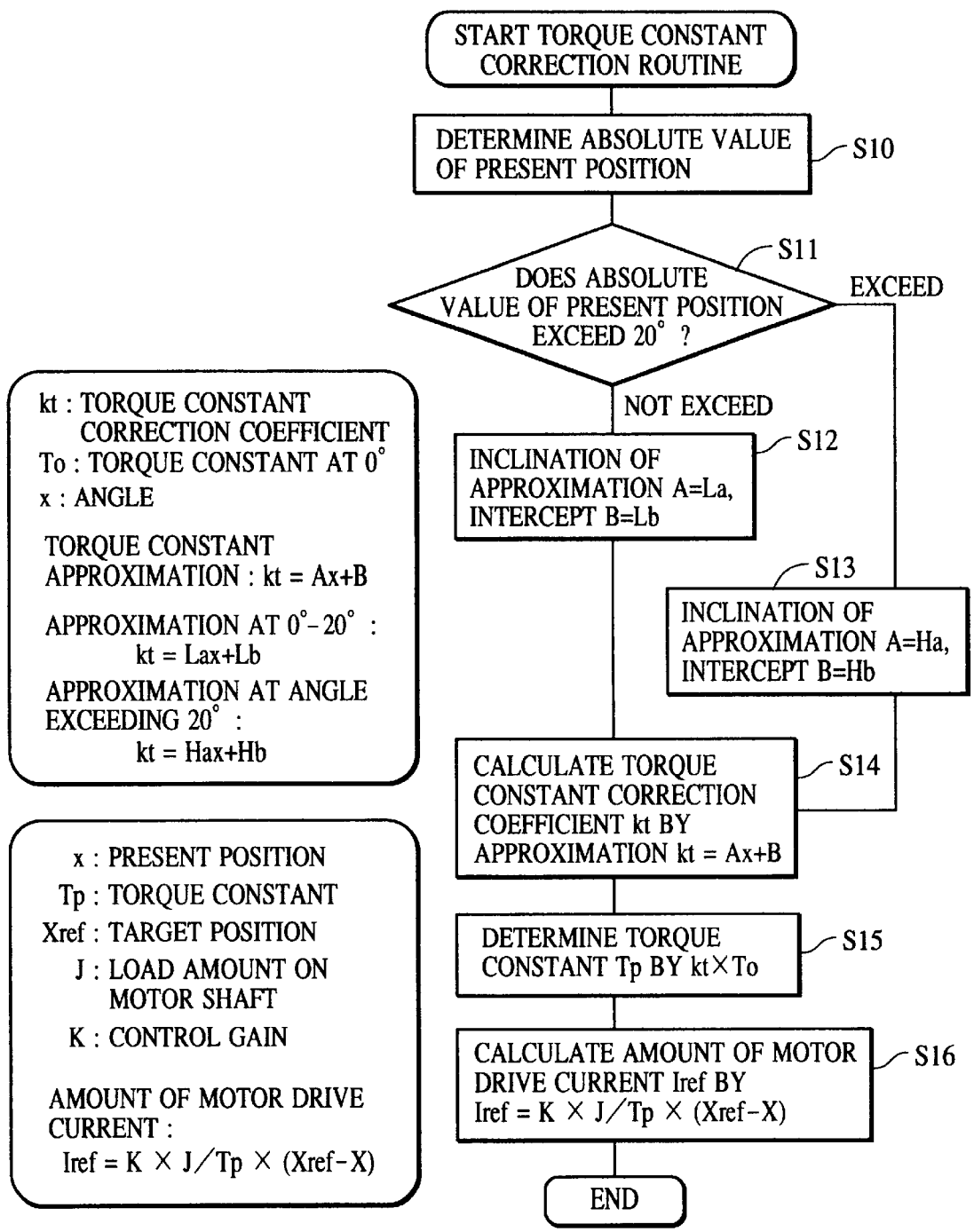
FIG. 5 is a flowchart of the arithmetic unit shown in FIG. 4.

An arithmetic processing operation executed by the arithmetic unit 5 will be described with reference to the flowchart of FIG. 5.

First, the rotation angle signal 4 generated by the rotation angle detection mechanism 3 is counted by the counter 54 and the absolute value of the present position of the rotation angle is determined by arithmetic unit 5 (step S10).

Next, arithmetic unit 5 determines whether the absolute value of the present position exceeds the value of a specific angle position (a value corresponding to, for example, 20° stored in the first register of the RAM 53) or not (step S11). When the absolute value does not exceed the value of the specific angle position, the arithmetic unit 5 sets the inclination A of a linear line to La and sets the intercept B thereof to Lb. That is, a first preset inclination value La and a first preset intercept value Lb are used (step S12). When the absolute value exceeds the value of the specific angle position at step S11, the inclination A of the linear line is set to Ha and the intercept B thereof is set to Hb (step S13). That is, a second preset inclination value Ha and a second preset intercept value Hb are used.

Then, arithmetic unit 5 calculates a torque constant correction coefficient kt from an approximation formula kt=Ax+B (step S14). That is, when an angle position x is located at 0° to 20°, the correction coefficient kt is calculated using an approximation formula kt=Lax+Lb, whereas when the angle position is located at an angle larger than 20°, the correction coefficient kt is calculated using an approximation formula kt=Hax+Hb. A torque constant Tp is determined by calculating kt×$T_0$ using the thus calculated value kt (step S15).

Subsequently, an amount of motor drive current Iref is calculated from an arithmetic expression Iref=K×J/Tp×(Xref−X) using a present angle position X, the torque constant Tp, the target position Xref stored in a register A, a register B and a register C of the second register of the RAM 53, an amount of load J imposed on a motor shaft, and a control gain K (step S16). The thus calculated amount of motor drive current Iref is output from the output unit 55 to the motor drive unit 7 as the motor drive command signal 6.

Another example of a specific circuit of the arithmetic unit 5 shown in FIG. 1 will be described with reference to FIG. 6.

Figure 6:
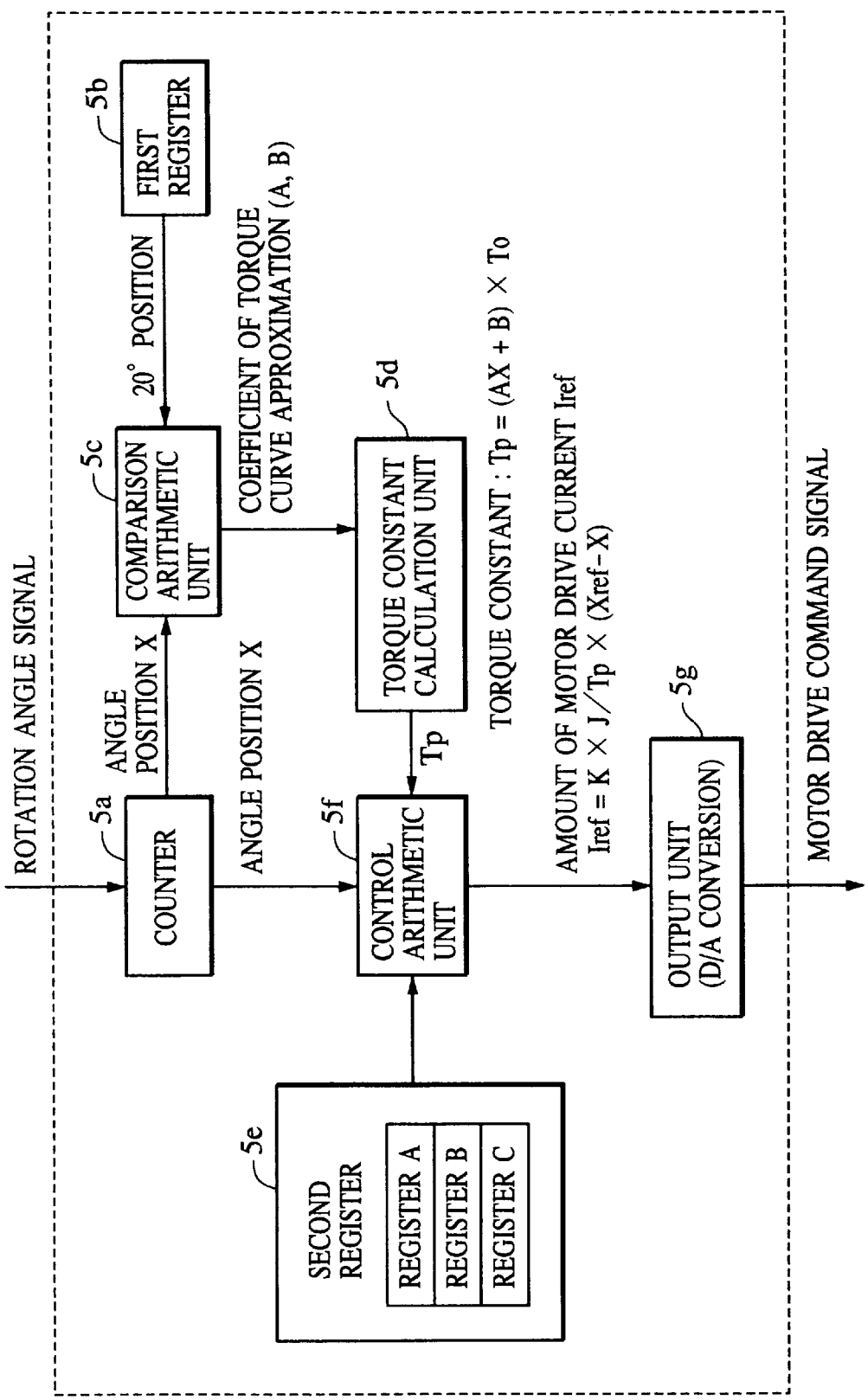
FIG. 6 is a block diagram showing another example of the specific circuit of the arithmetic unit shown in FIG. 1.

In FIG. 6, numeral 5a denotes a counter to which the rotation angle signal 4 is applied from the rotation angle detection mechanism 3 and numeral 5b denotes a first register for storing a value corresponding to 20°, which is the angle of a specific angle position. Numeral 5c denotes a comparison arithmetic unit for comparing the count value of the counter 5a with the value of the first register 5b. Numeral 5d denotes a torque constant calculation unit for calculating a correction coefficient using the inclination of the linear approximation formula, which is determined as a result of the arithmetic operation executed by the comparison arithmetic unit 5c, and for calculating the torque constant parameter Tp by Kt×$T_0$ or (AX+B)×$T_0$ since Kt equals AX+B. Numeral 5e denotes a second register including a register A, a register B and a register C in which the target position Xref, the amount of load J imposed on the motor shaft and the control gain K are stored. Numeral 5f denotes a control arithmetic unit for calculating the amount of motor drive current Iref from the arithmetic expression Iref=K×J/Tp x (Xref−X) using the present angle position X from the counter 5a and the torque constant Tp from the torque constant calculation unit 5d as factors. Numeral 5g denotes an output unit for outputting the amount of motor drive current Iref supplied from the control arithmetic unit 5f to the motor drive unit 7 as the motor drive command signal 6.

The operation of the arithmetic unit 5 will be described.

The rotation angle signal 4 is supplied from a rotation angle detection mechanism 3 to the arithmetic unit 5 and counted by the counter 5a. The comparison arithmetic unit 5c compares the present angle position, which is the count value of the counter 5a, with the value of the first register 5b, which corresponds to 20° as the angle of the specific angle position, and the torque constant Tp is calculated by the torque constant calculation unit 5d based on the result of the comparison executed by the comparison arithmetic unit 5c. That is, when the present angle position does not exceeds 20°, the correction coefficient Tp is calculated using the linear approximation formula kt=Lax+Lb in which the inclination A of the approximation formula is set to La and the intercept B thereof is set to Lb, whereas when the present angle position exceeds 20°, the correction coefficient Tp is calculating using the linear approximation formula kt=Hax+Hb in which the inclination A of the approximation formula is set to Ha and the intercept B thereof is set to Hb and the torque constant Tp is calculated by Kt×$T_0$. The control arithmetic unit 5f calculates the amount of motor drive current Iref from the arithmetic expression Iref=K×J/Tp×(Xref−X) using the present angle position X which is the count value of the counter 5a, the torque constant Tp from the torque constant calculation unit 5d, the target position Xref stored in the register A, register B and register C of the second register 5e, the amount of load J imposed on the motor shaft and the control gain K. The amount of motor drive current Iref calculated by the control arithmetic unit 5f is supplied to the output unit 5g and from the output unit 5g to the motor drive unit 7 as the motor drive command signal 6.

FIGS. 7A–7F show graphs indicating the result of examination of the difference of step response waveforms at respective positions at 0° (FIGS. 7A and 7B), +35° (FIGS. 7C and 7D) and −35° (FIGS. 7E and 7F) when the torque constant is corrected and when it is not corrected. In each of the graphs, the abscissa represents time, an upper short waveform shows a time until settling is finished and a lower waveform shows a settled waveform and the ordinate shows an amount of movement. It can be found that a settling property is improved by the correction of the torque constant and a settling time is shortened.

Figure 7A:
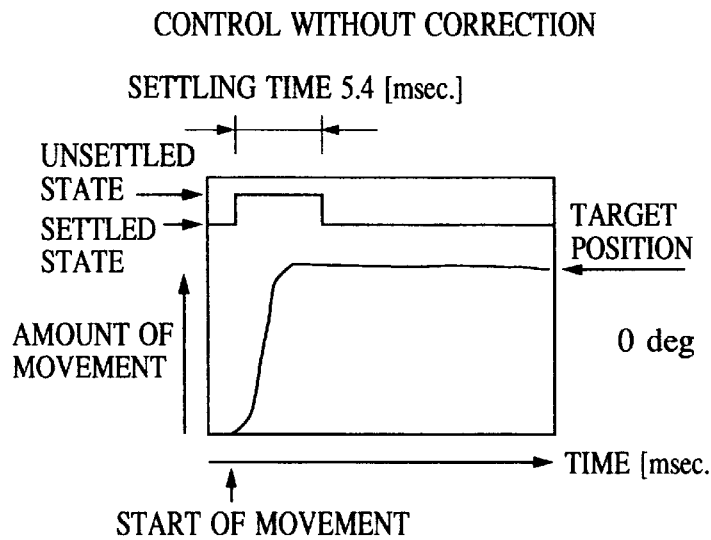
FIGS. 7A–7F illustrate graphs showing step response waveforms when a torque constant is corrected and when it is not corrected.
Figure 7B:
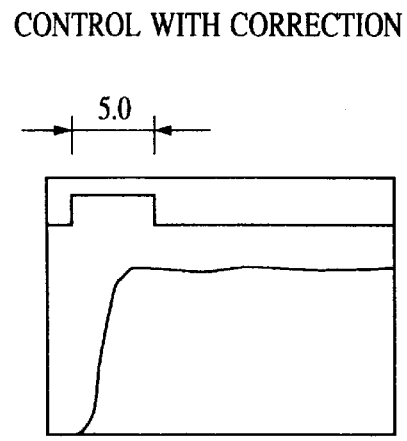
Figure 7C:
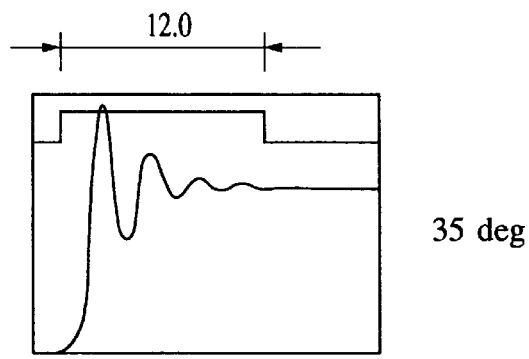
Figure 7D:
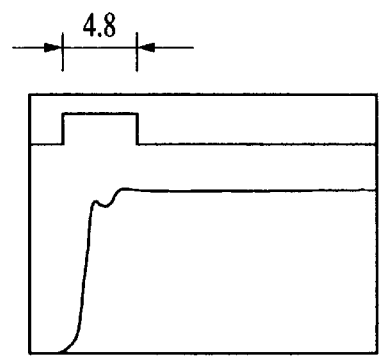
Figure 7E:
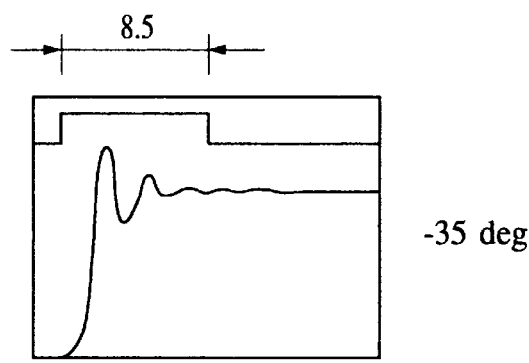
Figure 7F:
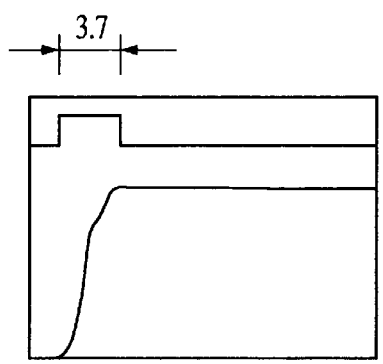

More specifically, FIGS. 7A, 7C, and 7E show the control of movement of the motor 1 by the motor drive unit 7 without the arithmetic unit 5 correcting the torque constant, while FIGS. 7B, 7D, and 7F show the control of movement of the motor 1 by the motor drive unit 7 when the arithmetic unit 5 corrects the torque constant. As seen in FIGS. 7A and 7B, correcting the torque decreases the settling time from 5.4 msec to 5.0 msec when the motor is at 0°. As seen in FIGS. 7C and 7D, correcting the torque decreases the settling time from 12.0 msec to 4.8 msec when the motor is at 35°, and as seen in FIGS. 7E and 7F, correcting the torque decreases the settling time from 8.5 msec to 3.7 msec when the motor is at −35°.

Figure 8:
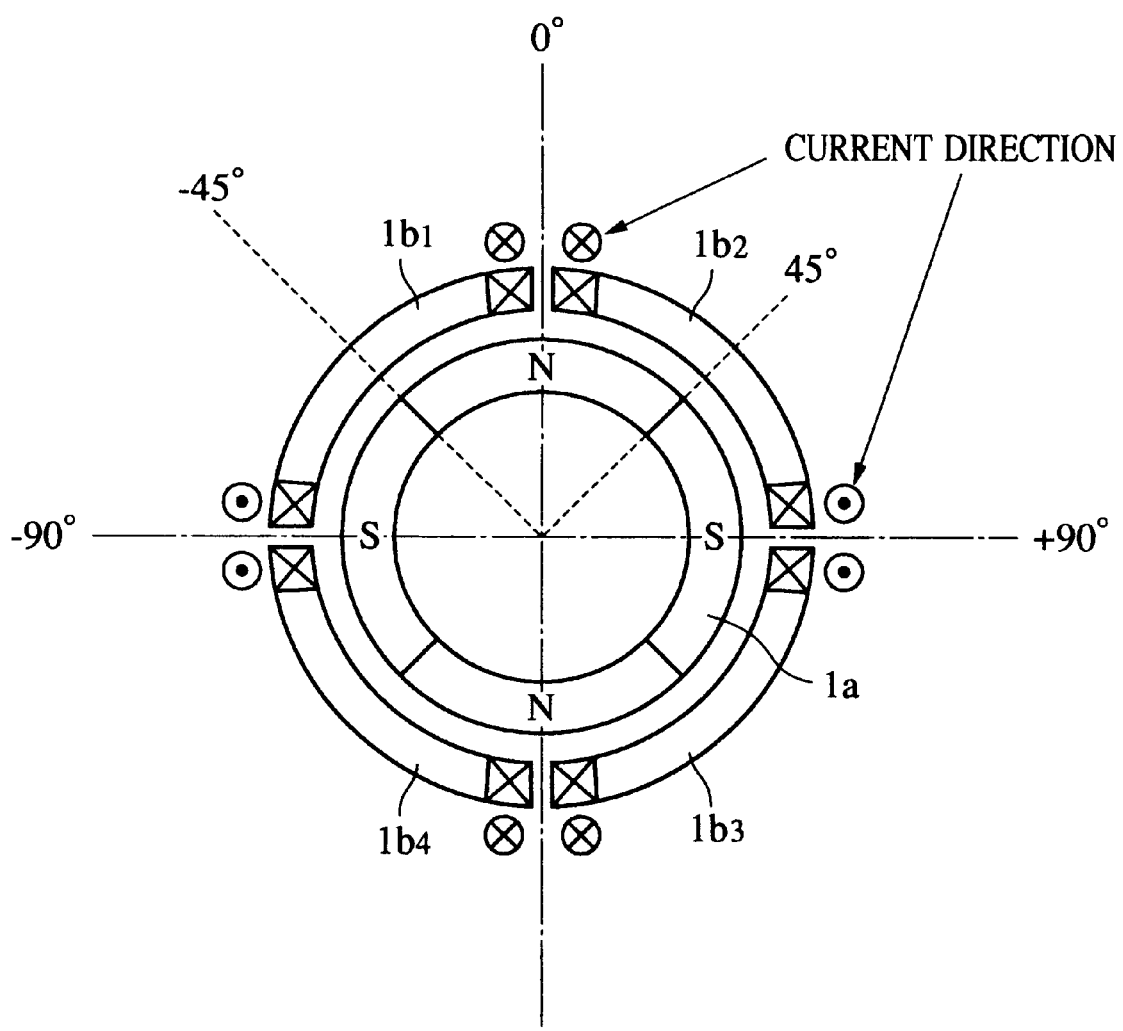
FIG. 8 is a cross-sectional view showing the arrangement of the motor shown in FIG. 1.

FIG. 8 shows the arrangement of the one-phase electromagnetic motor 1 shown in FIG. 1, wherein numeral 1a denotes a rotary magnet having four magnetized poles, numerals 1b1, 1b2, 1b3, 1b4 denote winding coils and these winding coils 1b1, 1b2, 1b3, 1b4 are successively connected. Torque is maximized at 0° in the illustrated state. The energization of the winding coils 1b1, 1b2, 1b3, 1b4 in one direction permits the rotary magnet 1a to be rotated in one direction and the energization thereof in the other direction permits the rotary magnet 1a to be rotated in the other direction. The motor drive current 8 is supplied from the motor drive unit 7 to these winding coils 1b1, 1b2, 1b3, 1b4.

(Embodiment 2)

When it is desired to more strictly approximate the torque rotational position curve shown in FIG. 2 in the rotational position determination mechanism shown in the embodiment 1, it suffices only to increase the number of approximating linear lines. In general, when a torque rotational position curve, which is symmetrical with reference to the origin as shown in FIG. 2, is approximated by n linear lines, the torque constant can be corrected by an arithmetic operation in which absolute value conversion is executed once and condition branching is executed ((n/2)−1) times using a linear expression.

Figure 9:
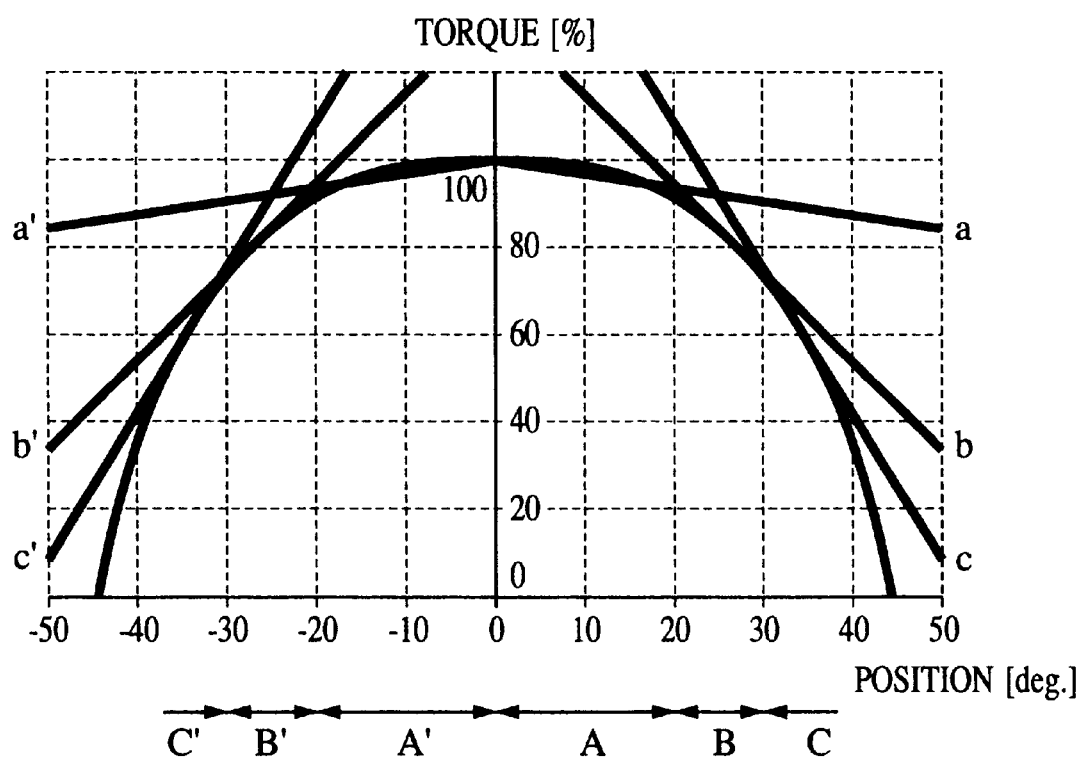
FIG. 9 is a graph which relates to a second embodiment of the present invention and shows linear lines which approximate the torque characteristics, respectively when the they are divided into six zones.

FIG. 9 shows a second embodiment in which the number of approximation linear lines is set to 6. The curve in a zone A (0° to +20°) is approximated by a linear line a;

the curve in a zone B (+20° to +30°) is approximated by a linear line b; the curve in a zone C (greater than +30°) is approximated by a linear line c; the curve in a zone A' (0° to −20°) is approximated by a linear line a'; the curve in a zone B'(−20° to −30°) is approximated by a linear line b'; and the curve in a zone C' (less than −30°) is approximated by a linear line c'. At the time, the torque constant is corrected by the absolute value conversion executed once and condition branching executed twice using a linear expression.

Next, although an arithmetic unit 5 according to the second embodiment of the present invention is described, since a block circuit showing an example of a specific circuit of the arithmetic unit 5 is the same as the block arrangement of FIG. 4, the description of the circuit arrangement is omitted.

Figure 10:
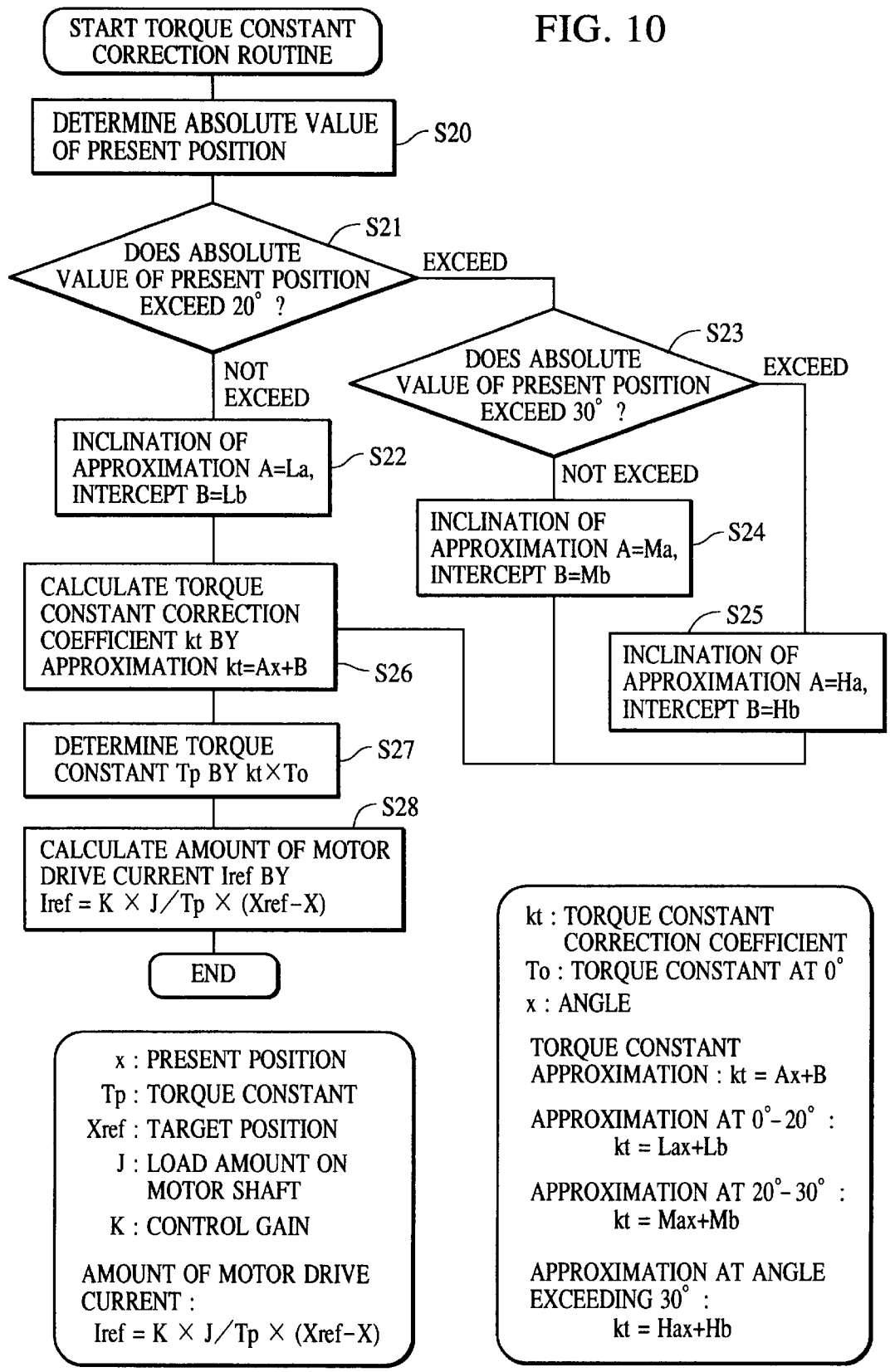
FIG. 10 is a flowchart of a block circuit which relates to the second embodiment of the present invention and shows an example of a specific circuit of an arithmetic unit.

An arithmetic processing operation of an arithmetic unit 5 according to the embodiment 2 will be described with reference to the flowchart of FIG. 10.

First, the rotation angle signal 4 detected by the rotation angle detection mechanism 3 is counted by a counter 54 and the arithmetic unit 5 determines the absolute value of the present position of the rotation angle (step S20).

Next, arithmetic unit 5 determines whether the absolute value of the present position exceeds a first specific angle (a value corresponding to, for example, 20° stored in the first register of a RAM 53) or not (step S21). When the absolute value does not exceed the specific angle position, arithmetic unit 5 sets the inclination A of the linear approximation formula to La and arithmetic unit 5 sets the intercept value B thereof to Lb (step S22). That is, a first preset inclination value La and a first preset intercept value Lb are used. When the absolute value exceeds the specific angle position at step S21, arithmetic unit 5 determines whether the absolute value exceeds a second specific value (a value corresponding to, for example, 30° stored in first register of the RAM 53) or not (step S23). When the absolute value does not exceed the second specific value, arithmetic unit 5 sets the inclination A of the linear approximation formula to Ma and arithmetic unit 5 sets the intercept value B thereof to Mb set (step S24). That is, a second preset inclination value Ma and a second preset intercept value Mb are used. When the absolute value exceeds the second specific angle position at step S23, arithmetic unit 5 sets the inclination A of the linear approximation formula to Ha and arithmetic unit 5 sets the intercept value B thereof to Hb (step S25). That is, a third preset inclination value Ha and a third preset intercept value Hb are used.

Then, arithmetic unit 5 calculates a torque constant correction coefficient kt from an approximation formula kt=Ax+B (step S26). That is, when the angle position x is located at 0° to 20°, arithmetic unit 5 calculates the correction coefficient kt using an approximation formula kt=Lax+Lb, when the angle position x is located at 20° to 30°, arithmetic unit 5 calculates the correction coefficient kt using an approximation formula kt=Max+Mb and when the angle position x is located at an angle larger than 30°, arithmetic unit 5 calculates the correction coefficient kt using an approximation formula kt=Hax+Hb. Next, arithmetic unit 5 determines a torque constant Tp by calculating kt×$T_0$ using the thus calculated value kt (step S27).

Subsequently, the arithmetic unit 5 calculates the amount of motor drive current Iref from the arithmetic expression Iref=K×J/Tp×(Xref−X) using a present angle position X, the torque constant Tp, the target positions Xref stored in the register A, the register B and the register C of the second register of the RAM 53, an amount of load J imposed on a motor shaft and a control gain K (step S28). The thus calculated amount of motor drive current Iref is output from an output unit 55 to a motor drive unit 7 as a motor drive command signal 6.

Next, another example of the specific circuit of the arithmetic unit according to the second embodiment will be described with reference to FIG. 11.

Figure 11:
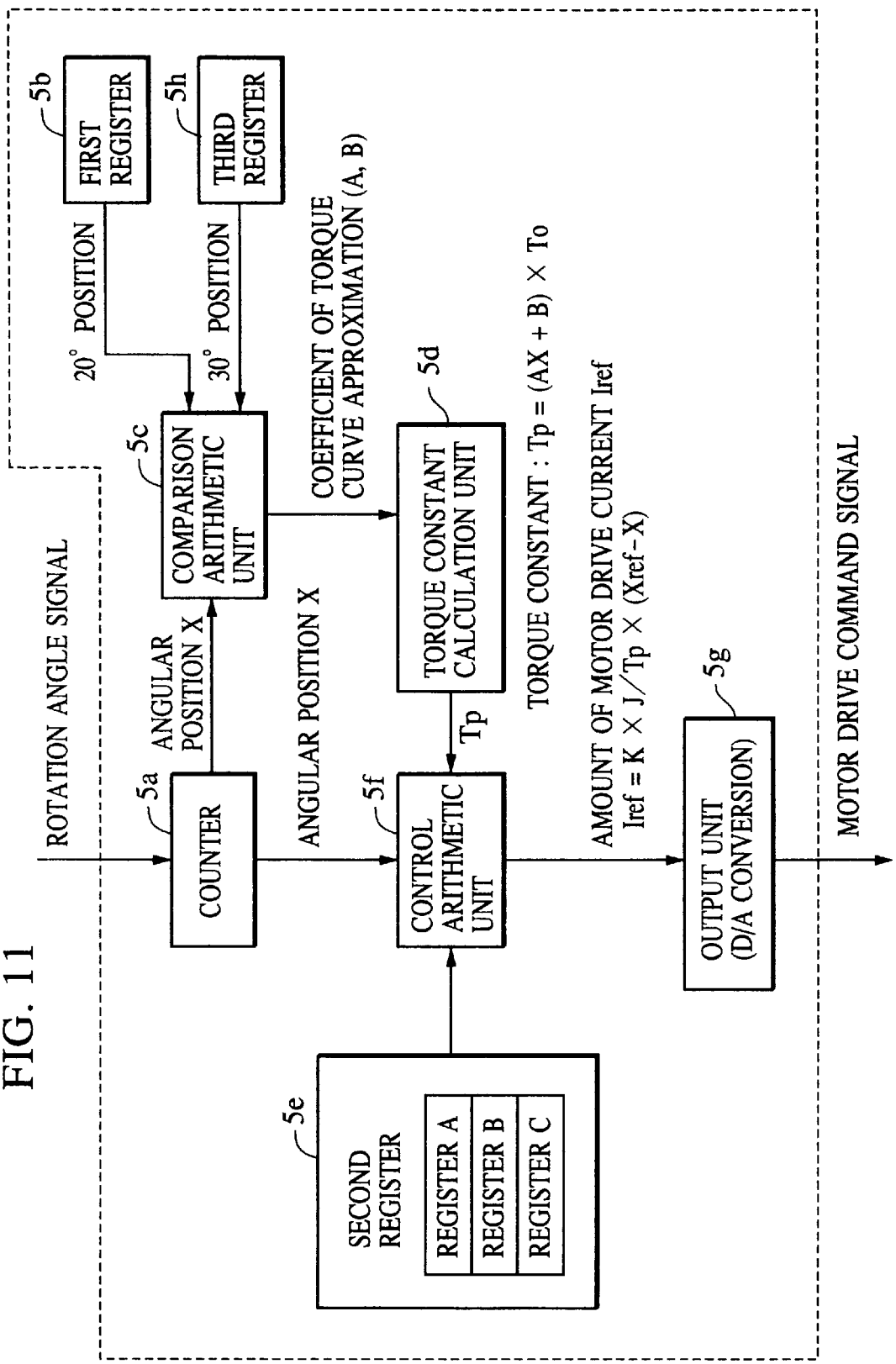
FIG. 11 is a block diagram which relates to the second embodiment of the present invention and shows another example of the specific circuit of the arithmetic unit.

The arrangement shown in FIG. 11 is achieved by adding a third register 5h to the block circuit of FIG. 6.

The operation of the thus arranged arithmetic unit 5 will be described.

A rotation angle signal 4 from a rotation angle detection mechanism 3 is supplied to the arithmetic unit 5 and counted by a counter 5a. A comparison arithmetic unit 5c compares the present angle position, which is the count value of the counter 5a, with the value of a first register 5b, which corresponds to 20° as the angle of the specific angle position, and the value of a third resister 5h, which corresponds to 30° as the angle of the specific angle position, and the torque constant Tp is calculated by a torque constant calculation unit 5d based on the result of the comparison executed by the comparison arithmetic unit 5c. That is, when the present angle position does not exceed 20°, the correction coefficient Tp is calculated using the linear approximation formula kt=Lax+Lb in which the inclination A of the approximation formula is set to La and the intercept B thereof is set to Lb. When the present angle position is 20° to 30°, the correction coefficient Tp is calculated using the linear approximation formula kt=Max+Mb in which the inclination A of the approximation formula is set to Ma and the intercept B thereof is set to Mb. When the present angle position exceeds 30°, the linear correction coefficient Tp is calculating using the approximation formula kt=Hax+Hb in which the inclination A of the approximation formula is set Ha and the intercept B thereof is set to Hb and the torque constant Tp is calculated by Kt×T$_0$. A control arithmetic unit 5f calculates the amount of motor drive current Iref from the arithmetic expression Iref K×J/Tp×(Xref−X) using the present angle position X, which is the count value of the counter 5a, the torque constant Tp from the torque constant calculation unit 5d, the target position Xref stored in the register A, the register B and the register C of the second register 5e, the amount of load J imposed on the motor shaft and the control gain K. The amount of motor drive current Iref calculated by the control arithmetic unit 5f is output to output unit 5g, which outputs it to a motor drive unit 7 as a motor drive command signal 6.

(Embodiment 3)

Figure 12:
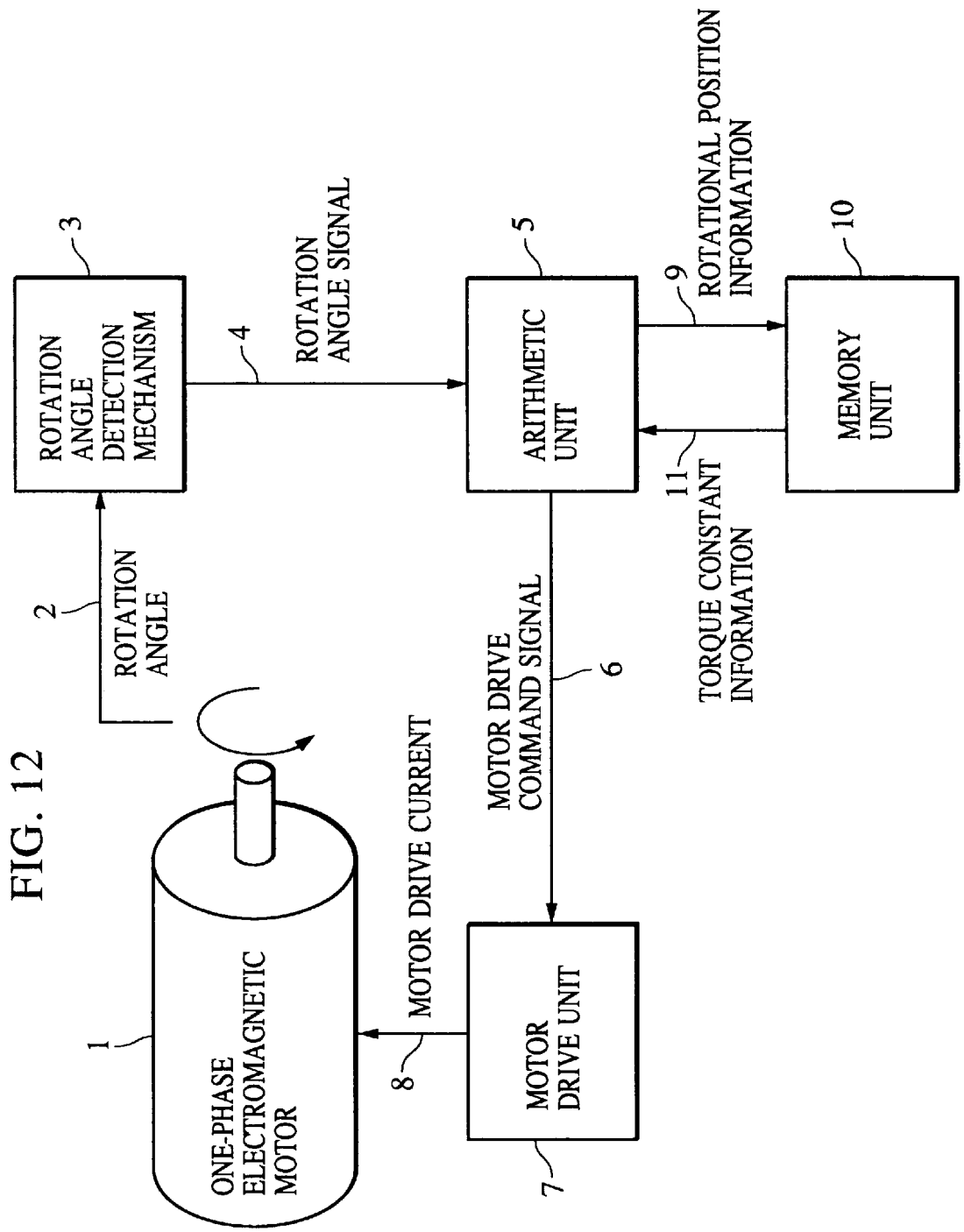
FIG. 12 is a block diagram of a motor drive controller according to a third embodiment of the present invention.

FIG. 12 is a block diagram showing a third embodiment of the present invention. In FIG. 12, components denoted by numerals 1 to 8 constitute a rotational position determination mechanism in the one-phase electromagnetic motor drive controller shown in the embodiment 1. Numeral 9 denotes rotational position information, numeral 10 denotes a memory unit and numeral 11 denotes torque constant information. FIG. 13 is a table showing the torque for every angle depending upon torque—rotational position characteristics in the third embodiment. In the rotational position determination mechanism shown in the first embodiment, a torque—rotational position curve as shown in FIG. 2 is summarized as the table shown in FIG. 13 and is previously stored in the memory unit 10. An arithmetic unit 5 refers to the table of FIG. 13 stored in the memory unit 10 in response to the rotational position information 9 (absolute value of rotational position) and obtains the torque constant information 11 corresponding thereto (torque constant correction coefficient). A torque constant at the rotational position is determined from the torque constant information 11 in the table and is applied by arithmetic unit 5 to a control calculation to drive the motor 1.

Next, a specific circuit of the arithmetic unit 5 shown in FIG. 12 will be described with reference to FIG. 14.

Figure 14:
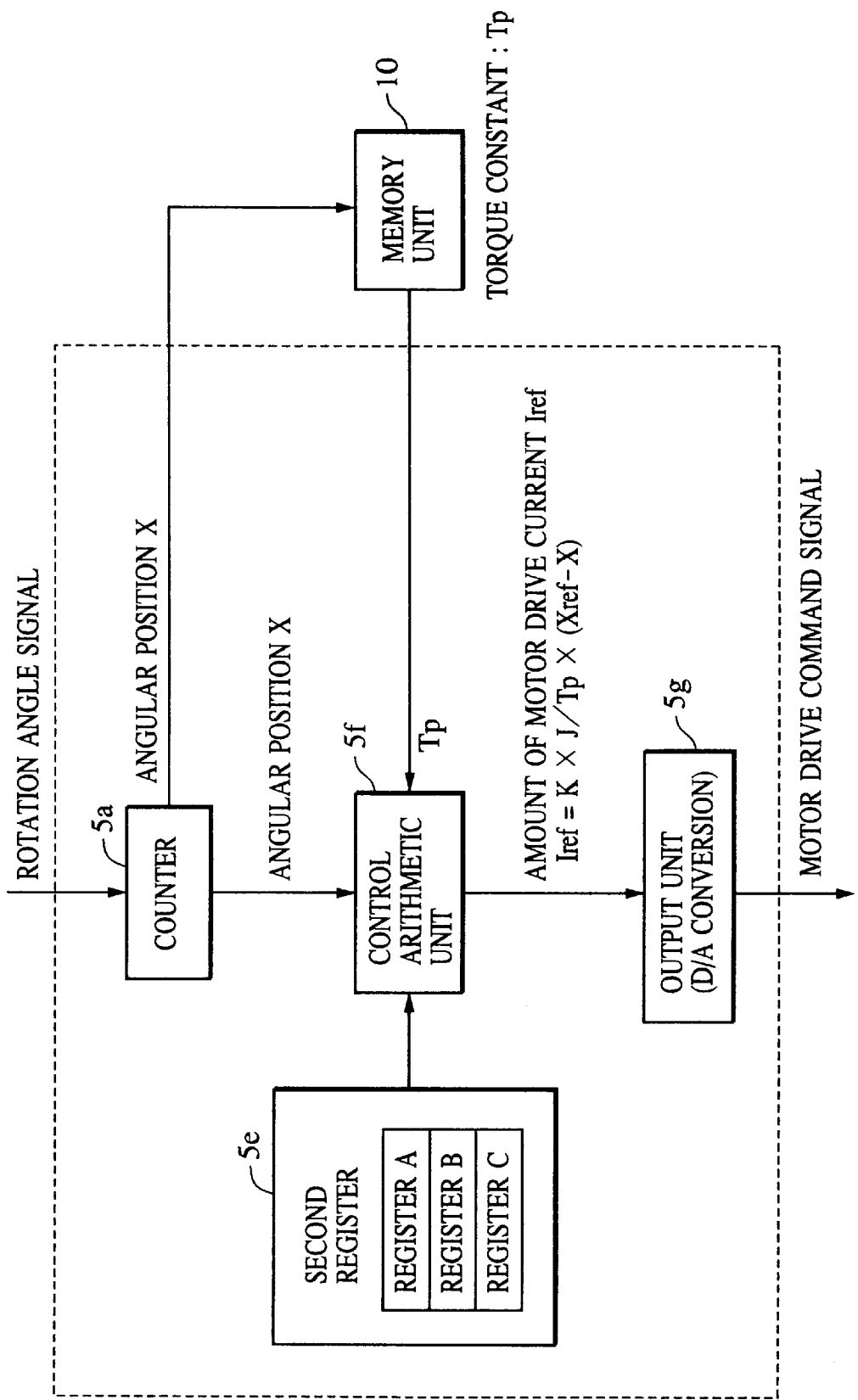
FIG. 14 is a block diagram which relates to the third embodiment of the present invention and shows a specific circuit of an arithmetic unit.

In FIG. 14, numeral 5a denotes a counter to which a rotation angle signal 4 is supplied from a rotation angle detection mechanism 3 and numeral 10 denotes the memory unit to which the count value of the counter 5a is supplied as position information and from which torque constant information Tp according to the position information is output to arithmetic control unit 5f. Numeral 5e is a second register including a register A, a register B and a register C in which a target position Xref, an amount of load J imposed on the motor shaft and control gain K are stored. Numeral 5f is a control arithmetic unit for calculating an amount of motor drive current Iref from the arithmetic expression Iref=K×J/Tp×(Xref−X) using the present angle position X from the counter 5a and the torque constant Tp from the memory unit 10 as factors. Numeral 5g denotes an output unit for outputting the amount of motor drive current Iref supplied from the control arithmetic unit 5f to a motor drive unit 7 as a motor drive command signal 6.

The operation of the arithmetic unit 5 will be described.

The rotation angle signal 4 from the rotation angle detection mechanism 3 is supplied to the arithmetic unit 5 and is counted by the counter 5a. The present angle position as the count value of the counter 5a is supplied to the memory unit 10, which outputs the torque constant information Tp according to the position information. The control arithmetic unit Sf calculates the amount of motor drive current Iref from the arithmetic expression Iref=K×J/Tp×(Xref−X) using the present angle position X, which is the count value of the counter 5a, the torque constant Tp from the memory unit 10, the target position Xref stored in the register A, the register B and the register C of the second register 5e, the amount of load J imposed on the motor shaft and the control gain K. The amount of motor drive current Iref calculated by the control arithmetic unit 5f is input to the output unit 5g, which outputs it to the motor drive unit 7 as the motor drive command signal 6.

Although the motor shown in FIG. 8 is driven within a particular angular range, it can be driven in rotation when the energization of the windings is switched in accordance with the detection of a rotation angle. Thus, the present invention can be also used when the motor is rotated.

As described above in detail, according to the present invention, since the torque constant is greatly changed depending upon the rotational position of the motor, the changing torque constant is derived by the approximation formula in accordance with a rotational position of the motor and used to calculate the amount of motor drive current. As a result, the torque constant can be corrected in accordance with a rotational position of the motor, whereby a high speed and stable control system can be realized in a wider driving range.

What is claimed is:

1. A motor drive controller using a torque constant as a factor for determining a motor drive current, comprising:

a motor;

position detection means for detecting a rotational position of said motor and outputting signals;

arithmetic means for counting the signals from said position detection means to determine a count value and determining a plurality of linear approximation formulas in accordance with the count value;

torque constant calculation means for determining a torque constant by a linear approximation formula determined by said arithmetic means; and means for using the torque constant determined by said torque constant calculation means as the factor for determining the motor drive current.

2. A motor drive controller according to claim 1, wherein the plurality of approximation formulas determined by said arithmetic means are represented by a plurality of linear expressions and are selected from a plurality of linear expressions in accordance with the count value of said arithmetic means.

3. A motor drive controller according to claim 1, wherein said motor is a one-phase electromagnetic motor drivable in a specific angle range and wherein said position detection means detects an angle position of the one-phase electromagnetic motor.

4. A motor drive controller using a torque constant as a factor for determining a motor drive current comprising:

a motor;

position detection means for detecting a rotational position of said motor;

a counter for counting the signals from said position detection means and producing a count value;

a register for storing the value of an amount corresponding to a specific rotational position of said motor;

comparison arithmetic means for comparing the count value of said counter with the value stored in said register and for determining a plurality of approximation formulas in accordance with the result of the comparison;

torque constant calculation means for determining torque constants by the approximation formulas determined by said comparison arithmetic means; and means for using the torque constants determined by said torque constant calculation means as the factor for determining the motor drive current.

5. A motor drive controller according to claim 4, wherein said register stores first and second values corresponding to first and second specific rotational positions of said motor and wherein said comparison arithmetic means compares the count value of said counter with the first and second values stored in said register.

6. A motor drive controller using a torque constant as a factor for determining a motor drive current, comprising:

a motor;

position detection means for detecting a rotational position of said motor;

a counter for counting the signals from said position detection means and providing a count value;

memory means for storing information of a plurality of torque constants, wherein information of one of the plurality of torque constants is selected in accordance with the count value of said counter; and means for using the selected torque constant stored in said memory means as the factor for determining the motor drive current.

7. A motor drive controller according to claim 6, wherein said memory means stores the relationship between position information as the count value of said counter and the torque constant information by summarizing it in a table and wherein torque constant information corresponding to the count value of said counter is selected in reference to the table.

8. A motor drive controller, comprising:

a motor;

position detection means for detecting a rotational position of said motor and generating a pulse signal at every specific rotation angle of said motor;

a counter for counting the pulse signals from said position detection means and providing a count value;

a first register for storing the value of an amount corresponding to a specific rotational position of said motor;

comparison arithmetic means for comparing the count value of said counter with the value stored in said first register and determining a plurality of linear approximation formula in accordance with the result of the comparison;

torque constant calculation means for calculating torque constant correction coefficients from the approximation formulas determined by said comparison arithmetic means and determining torque constants;

a second register for storing a value corresponding to a target rotational position; and means for determining an amount of drive current supplied to said motor by executing an arithmetic operation based on the torque constants determined by said torque constant calculation means, the value stored in said second register, the count value of said counter.

9. A motor drive controller according to claim 8, wherein said second register stores the amount of a load imposed on a motor shaft of said motor and the value of an amount corresponding to a control gain and said means for determining the amount of drive current supplied to said motor also calculates the amount of the load imposed on the motor shaft and the value of the amount corresponding to the control gain.

10. A motor drive controller using a torque constant a factor for determining a motor drive current, comprising:

a motor;

position detection means for detecting a rotational position of said motor;

discrimination means for discriminating a particular zone in a specific rotational position where a present rotational position detected by said position detection means is located;

linear expression determination means for determining the inclination value and the intercept value of a linear expression based on the zone determined by said discrimination means;

torque constant correction coefficient calculation means for calculating a torque constant correction coefficient from the linear expression determined by said linear expression determination means and the present rotational position detected by said position detection means; and means for calculating a torque constant based on the torque constant coefficient obtained by said torque constant correction coefficient calculation means.

* * * * *

UNITED STATES PATENT AND TRADEMARK OFFICE
CERTIFICATE OF CORRECTION

PATENT NO. : 6,043,622
DATED : March 28, 2000
INVENTOR(S) : Hiroyki Shomi et al.

It is certified that error appears in the above-identified patent and that said Letters Patent is hereby corrected as shown below:

Column 2:
Line 52, "rotational" should read --rotation--.

Column 3:
Line 48, "FIG. 1." should read --FIG. 1;--.
Line 52, "the" should be deleted.

Column 4:
Line 30, "by 1." should read --by I.--.
Line 32, "T=Tpx1" should read --T=TpxI--.

Column 6:
Line 24, "exceeds" should read --exceed--.

Column 7:
Line 31, Close up right margin.
Line 32, Close up left margin.

Column 8:
Line 66, "ing" should read --ed--.
Line 67, "set" should read --set to --.

Column 9:
Line 4, "Iref KxJ/Tpx(Xref-X)" should read -- Iref=KxJ/Tpx(Xref-X)--.
Line 66, "Sf" should read --5f--.

UNITED STATES PATENT AND TRADEMARK OFFICE
CERTIFICATE OF CORRECTION

PATENT NO. : 6,043,622
DATED : March 28, 2000
INVENTOR(S) : Hiroyuki Shimoi, et al.

It is certified that error appears in the above-identified patent and that said Letters Patent is hereby corrected as shown below:

Column 11:
Line 7, "4" should read --1--.
Line 46, "formula" should read --formulas--.

Column 12:
Line 21, "constant" should read --constant as--.

Signed and Sealed this

Nineteenth Day of June, 2001

*Attest:*

NICHOLAS P. GODICI
*Attesting Officer*    *Acting Director of the United States Patent and Trademark Office*